United States Patent [19]

Shinohara et al.

[11] Patent Number: 4,852,073
[45] Date of Patent: Jul. 25, 1989

[54] REMOTE CONTROL TRANSMISSION APPARATUS

[75] Inventors: Masayori Shinohara; Tsutomu Motomatsu; Makoto Hoshino, all of Tokorozawa, Japan

[73] Assignee: Pioneer Electronic Corporation, Tokyo, Japan

[21] Appl. No.: 102,390

[22] Filed: Sep. 29, 1987

[30] Foreign Application Priority Data

Sep. 30, 1986 [JP] Japan .............................. 61-232651
Jul. 8, 1987 [JP] Japan .............................. 62-170508

[51] Int. Cl.$^4$ .............................................. G09B 9/00
[52] U.S. Cl. ........................................ 369/32; 358/903
[58] Field of Search ..................... 369/24; 360/33.1; 358/335

[56] References Cited

U.S. PATENT DOCUMENTS

| | | | |
|---|---|---|---|
| 4,305,131 | 12/1981 | Best | 360/14.1 X |
| 4,422,105 | 12/1983 | Rodesch et al. | 358/335 |
| 4,450,487 | 5/1984 | Koide | 358/906 X |
| 4,456,931 | 6/1984 | Toyoda et al. | 358/335 |
| 4,459,622 | 7/1984 | Corkery | 360/10.3 |
| 4,499,509 | 2/1985 | Gohda et al. | 360/33.1 |

*Primary Examiner*—William L. Sikes
*Assistant Examiner*—Akm E. Ullah
*Attorney, Agent, or Firm*—Foley & Lardner, Schwartz, Jeffery, Schwaab, Mack Blumenthal & Evans

[57] ABSTRACT a remote control transmission apparatus for remote control of the operation of a recorded data playback apparatus such as a video or audio disc player is provided with a memory and a display. Data which are inputted by actuations of key switches, e.g. to produce command signals for controlling the playing apparatus to play specific tracks of a disc for example, appear on the display and can be stored in the memory and subsequently read out, displayed, and utilized when required. Immediate visible confirmation is thereby provided of all operations which are executed by the remote control apparatus, ensuring greatly improved convenience of use.

11 Claims, 15 Drawing Sheets

| MEMORY | A | B | C | D | E | F | G | H | I | J |
|---|---|---|---|---|---|---|---|---|---|---|
| TITLE AREA | | | | | | | | | | |
| PROGRAM AREA 1 STEP | | | | | | | | | | |
| 2 | | | | | | | | | | |
| 3 | | | | | | | | | | |
| 4 | | | | | | | | | | |
| 5 | | | | | | | | | | |
| 6 | | | | | | | | | | |
| ⋮ | | | | | | | | | | |
| 28 | | | | | | | | | | |
| 29 | | | | | | | | | | |
| 30 | | | | | | | | | | |
| 31 | | | | | | | | | | |
| 32 | | | | | | | | | | |

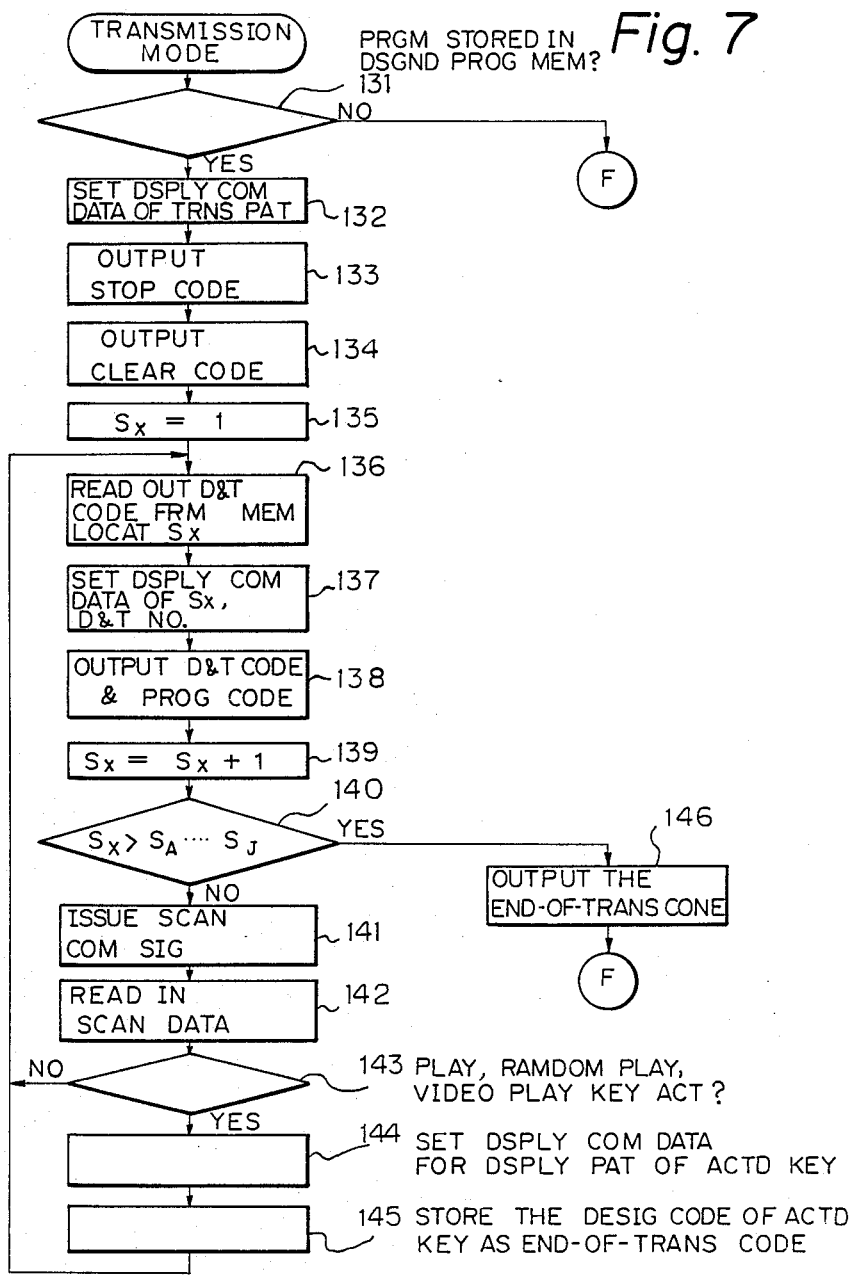

Fig. 10
(a) 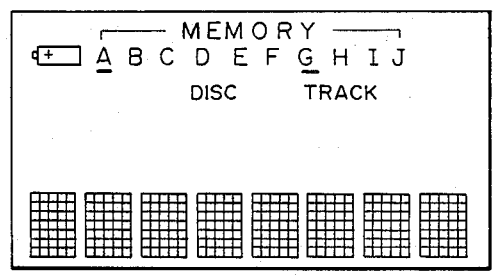
(b) 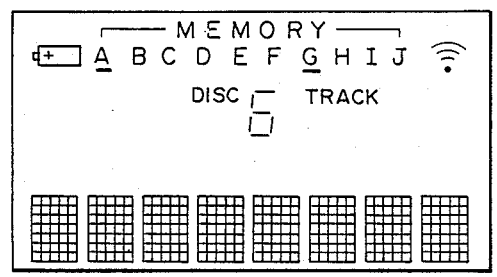
(c) 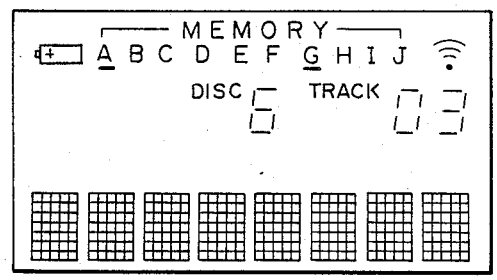
(d) 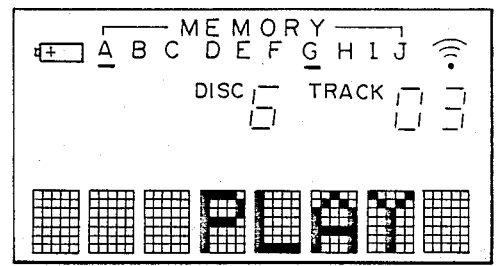

Fig. 13
(a) 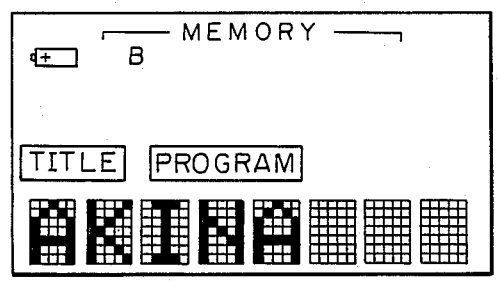
(b) 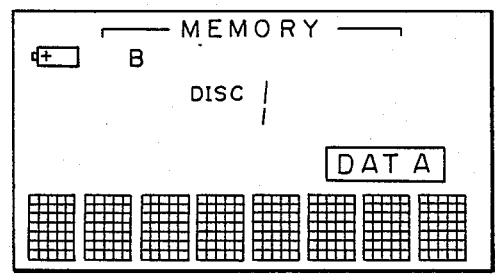
(c) 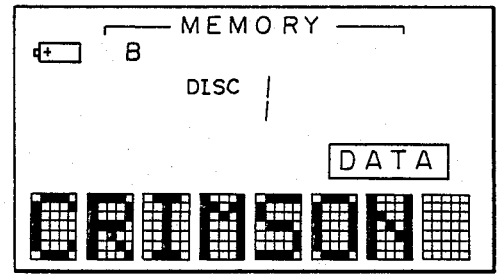
(d) 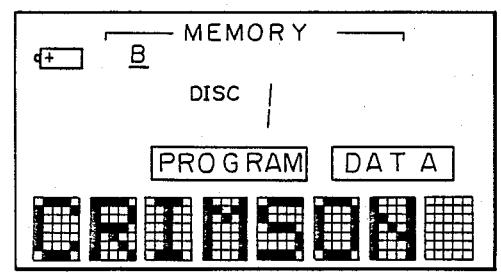

REMOTE CONTROL TRANSMISSION APPARATUS

BACKGROUND OF THE INVENTION

The present invention relates to a remote control transmission apparatus for executing remote operation of a controlled apparatus such as an audio or video disc player, etc.

With a prior art type of remote control transmission apparatus, only operating commands for the controlled apparatus can be generated, and it cannot be easily confirmed (i.e. by the user of the remote control transmission apparatus) whether a desired command has actually been transmitted. In particular, if the remote control transmission apparatus is provided with a large number of operating keys, then the user may be unable to clearly understand whether actuation of a key will actually result in a desired operation. For example if the user should make a mistake in actuating an operating key, there will be no indication provided of this error. In addition, it is difficult for the user of the remote control transmission apparatus to ascertain data which are changed at the controlled apparatus end, for example titles of items which are recorded on a disc which is being played, in the case of an audio CD player or a video disc player being controlled. Thus such a prior art remote control transmission apparatus is deficient with regard to ease of use.

SUMMARY OF THE INVENTION

It is an objective of the present invention to provide a remote control transmission apparatus which will overcome the problem of the prior art described above, and provide greater ease and convenience of use.

A remote control transmission apparatus according to the present invention is provided with a plurality of keys for executing remote operation of a controlled apparatus, and comprises a plurality of display elements capable of displaying at least characters which form a character pattern, designation means for designating display data which are to be displayed by the display elements, memory means for storing display data which are designated by the designation means, and drive means for reading out, in accordance with actuation of the keys, stored data from the memory means and for displaying the data by the display elements.

BRIEF DESCRIPTION OF THE DRAWINGS

FIGS. 5 through 9 are flow charts for assistance in describing the operation of a control circuit in the apparatus of FIG. 1;

FIGS. 10, 12 and 13 show respective LCD display states;

DESCRIPTION OF THE PREFERRED EMBODIMENTS

Figure 1:
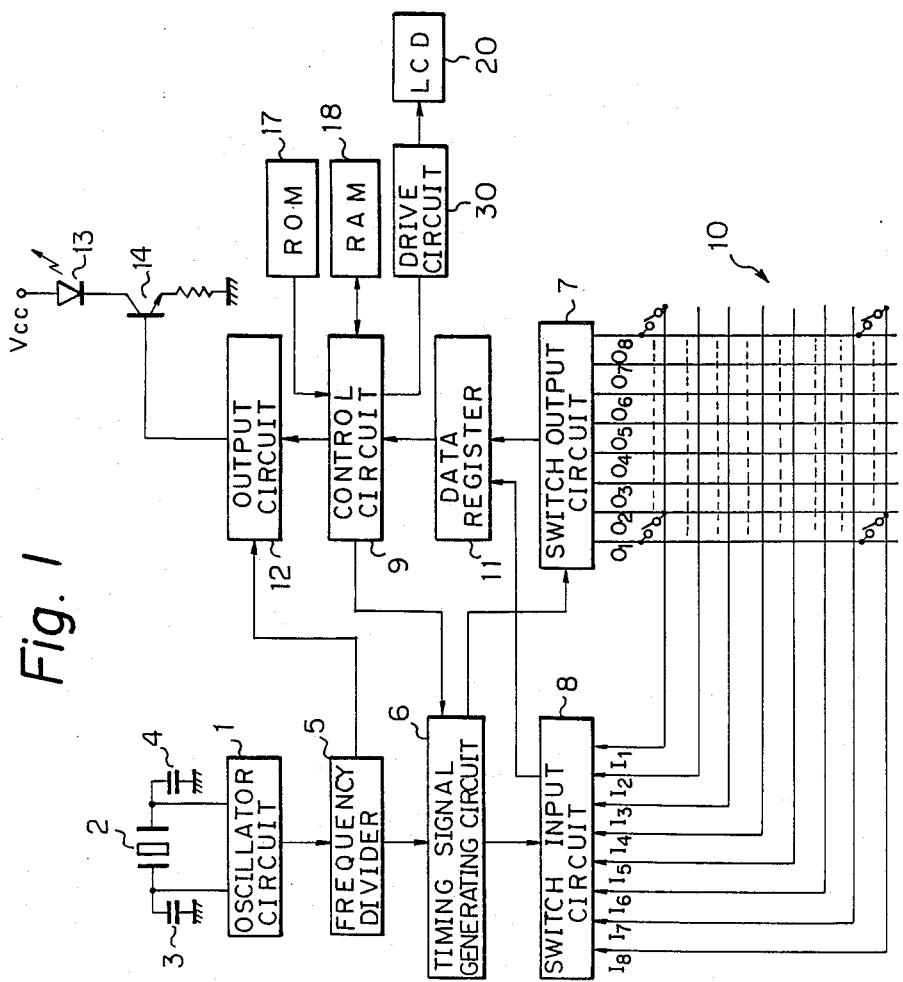
FIG. 1 is a circuit diagram of an embodiment of the present invention.

An embodiment of the present invention will be described in the following, referring to the drawings.

Figure 2:
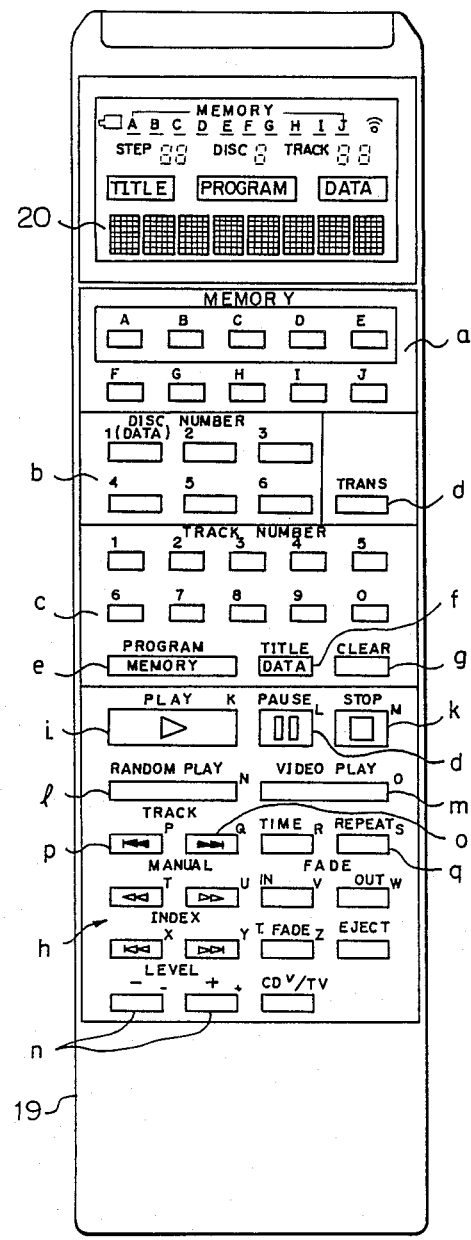
FIG. 2 is an external view of the remote control transmission apparatus shown in FIG. 1.

FIGS. 1 and 2 show an embodiment of the present invention, consisting of a remote control transmission apparatus for a CD (compact disc) player. This CD player is a magazine type of disc player which enables six discs to be set thereon simultaneously, whereby one of the discs can be selected to be played. In addition such a CD player is capable of playing discs which have both audio and video data recorded thereon (sometimes referred to as CDV discs).

Figures 3, 4:
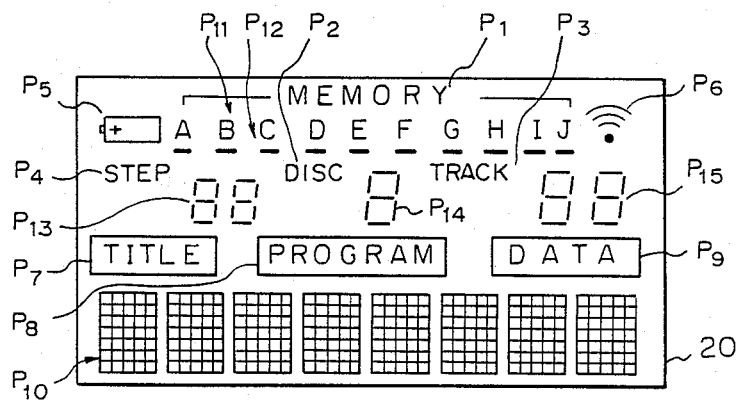
FIG. 3 is a diagram for illustrating memory storage areas.
FIG. 4 shows a LCD.

In the remote control transmission apparatus shown in FIG. 1, an oscillation signal at a first reference frequency is generated by an oscillator circuit 1 at a frequency determined by a vibrator element 2 and capacitors 3 and 4. The output oscillation signal from oscillator circuit 1 is transferred through a frequency divider 5 to a timing signal generating circuit 6. A timing signal which is thereby produced from timing signal generating circuit 6 is supplied to a switch output circuit 7 and to a switch input circuit 8, while in addition a frequency-divided signal produced from the frequency divider 5 is supplied to an output circuit 12. A switch matrix 10 is formed between the switch output circuit 7 and the switch input circuit 8. As shown in FIG. 2, the operating members, i.e. actuating keys, of a set of switches which constitute the switch matrix 10 are provided in a front panel of a case 19 of the remote control transmission apparatus, and consist of MEMORY "A" through "J" keys (reference letter a in FIG. 2) which are used for designating a memory, DISC NUMBER "1" through "6" keys for designating a disc (reference letter b), TRACK NUMBER "1" through "0" keys for designating a track (reference letter c), a TRANS key for executing transmission of a program which is stored in a memory to the CD player (reference letter d), a PROGRAM MEMORY key for storing programs in memory (reference letter e), a TITLE/DATA key for designating operation in a title mode, described hereinafter (reference letter f), a CLEAR key (reference letter g), and a set of basic operating keys for operating the CD player (reference letter h). The DISC NUMBER "1" through "6" keys and TRACK NUMBER "1" through "0" keys are also used as numeric keys, during operation in a data mode and in a title mode (described hereinafter). The MEMORY "A" through "J" keys and the basic operating keys are also used as alphabetic character keys for input of alphabetic data during operation in the data mode and title mode. The basic operating keys consist of a PLAY key (reference letter i) for sending a "begin playing" command to the CD player, a PAUSE key (reference letter j) for issuing a "pause playing" command to the CD player, a STOP key (reference letter k) for issuing a "terminate playing" command to the CD player, and a REPEAT key (reference letter q). The output terminal of the output circuit 8 is connected through a data register 11 to a control circuit 9 which consists of a microprocessor The control circuit 9 is coupled to a ROM 17, a RAM 18 and to the output circuit 12. The ROM 17 has operating programs for the remote control transmission apparatus, command codes, display character codes etc. (described hereinafter) previously stored therein. The RAM 18 is configured as a set of memories A through J, which are arranged as shown in FIG. 3. The memories A through J respectively consist of program areas and title areas, with a portion of each of the program areas of memories A through E being also utilizable as a data area. The output circuit 12 performs output operations in accordance with the frequency-divided signal which is supplied thereto from the frequency divider 5, and a drive transistor 14 for a light-emitting diode 15 is coupled to the output terminal of the output circuit 12.

A timing signal is produced from the timing signal generating circuit 6 in response to a scan command signal being produced as output from the control circuit 9, and this timing signal is supplied to the switch output circuit 7 and the switch input circuit 8. In response to the timing signal, first scan signals are generated at the high logic level at successive predetermined time intervals, from output terminals 01 through 08 of the switch output circuit 7, whereby respective rows of the switch matrix 10 are set to the high logic level. When a switch of the switch matrix 10 is set in the closed state, by actuation of the corresponding key, a high level signal is supplied to the one of the input terminals $I_1$ through $I_8$ of the switch input circuit 8 which corresponds to the row containing the actuated switch, when the column corresponding to that switch is set to the high logic level by the first scan signal. In this way, an $8 \times 8$ bit scan data format is implemented. The scan data that are thereby supplied to the switch input circuit 8 are sequentially stored in the data register 11. Based on this stored data, the control circuit 9 judges which of the keys has been actuated, reads out an 8-bit command code from the the ROM 17 which corresponds to the actuated key, and temporarily stores this command code in a register (not shown in the drawings). A command code signal containing this command code and a custom code is then supplied to the output circuit 12, in accordance with a timing signal. The custom code is incorporated in order to ensure that any other nearby apparatus having a remote control function will not respond to a remote control data transmission which is directed to the CD player. The frequency-divided signal produced from the output circuit 12 is modulated in accordance with the command code signal, and the resultant modulated signal is supplied to the transistor 14, which executes ON/OFF switching in response to thereby switch the light-emitting diode 13 between the ON and OFF states, i.e. light-emitting and non-emitting states. The switched emission of light from the LED 13 is produced from an end section of case 19, as the command code signal. A drive circuit 30 for driving an LCD (liquid crystal display) panel 20 is also connected to the control circuit 9, and drives the LCD 20 in accordance with the contents of display command data which are designated by the control circuit 9. As shown in FIG. 2, the LCD 20 is mounted at the top of the operating panel of case 19. FIG. 4 shows the LCD 20 alone. For convenience of understanding, the LCD 20 is shown in a condition in which all of the possible displayable patterns are displayed. P1 denotes a "MEMORY" pattern, P2 a "DISC" pattern, P3 denotes a "TRACK" pattern, P4 a "STEP" pattern, P5 "BATTERY" pattern, P6 a transmission pattern, P7 a "TITLE" pattern, P8 a "PROGRAM" pattern, P9 a "DATA" pattern, P10 an 8-character dot display section, P11 a memory display section, P12 a bar display section, P13 a STEP 7-segment display section, P14 a DISC 7-segment display section, and P15 denotes a TRACK 7-segment display section. Since display command data that are established by the control circuit 9 are expressed by the contents of the patterns and display sections P1 tnrough P15, the drive circuit 30 drives the pattern and display sections P1 through P15 of LCD 20 in accordance with that display command data.

Figure 5:
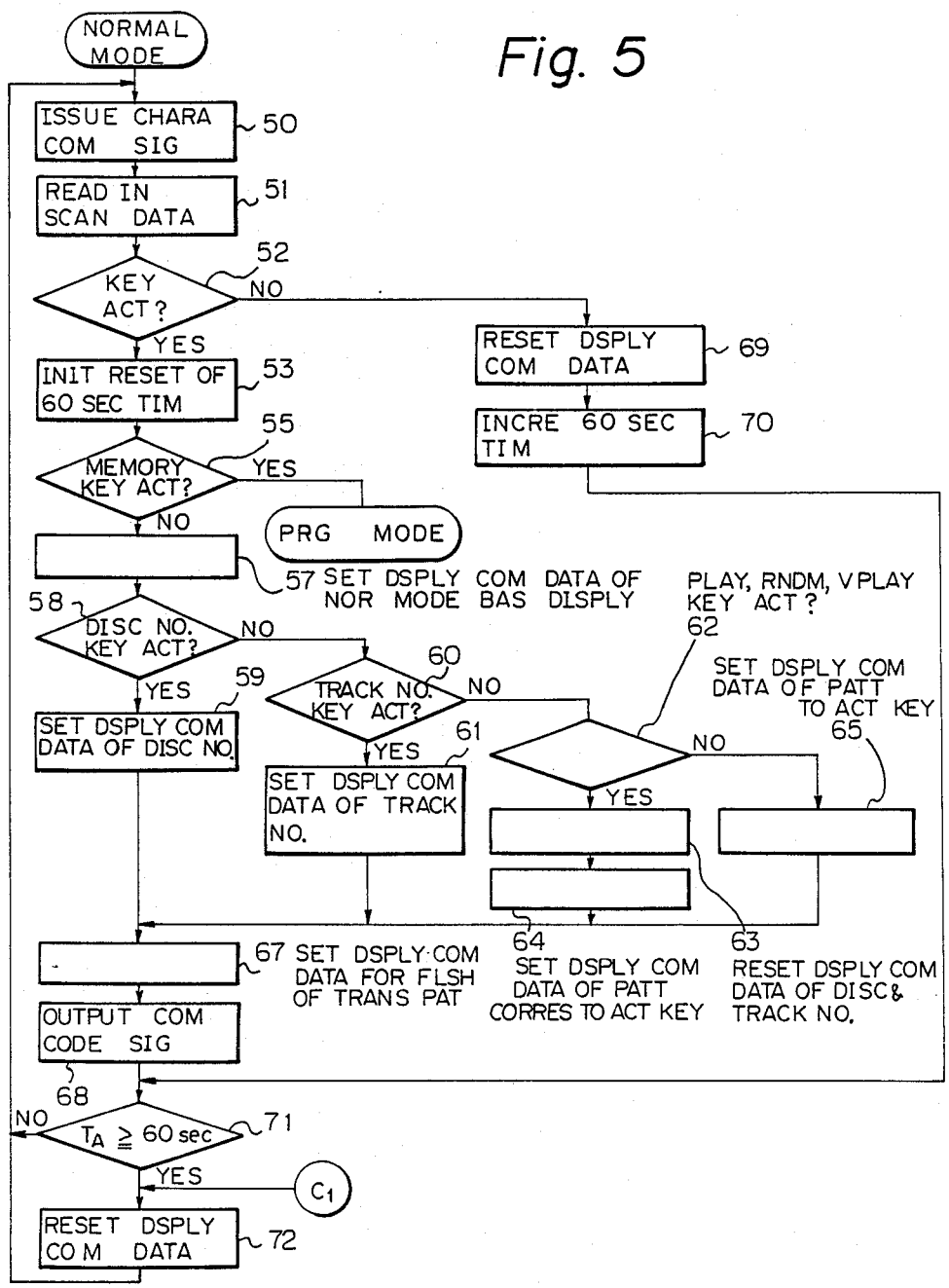

The operation flow of the control circuit 9 will be described referring to the flow charts of FIGS. 5 through 9. Firstly, as shown in FIG. 5, the control circuit 9 generates a scan command signal for the timing signal generating circuit 6 (step 50, and reads the scan data which are thereby outputted from the data register 11 (step 51. The control circuit 9 then judges whether or not any key has been actuated, based upon the contents of that data (step 52). If it is judged that a key has been actuated, then initial reset of a 60 seconds timer (configured by the operating program) is performed (step 53). A decision is then made (i.e. by judgement executed by control circuit 9) as to whether or not any of MEMORY "A" through "J" keys has been actuated, by reading out the scan data which have been temporarily stored in the data register 11 (step 55). If any of the MEMORY "A" through "J" keys has been actuated, then operation moves to the program mode, to read out a program which is stored in the RAM 18. If none of the MEMORY "A" through "J" keys has been actuated, then since operation is in the normal mode, display command data are set such as to to produce the normal mode basic display by LCD 20 (step 57). That is to say, all of the "MEMORY" pattern, "DISC" pattern, "TRACK" pattern and "PROGRAM" pattern display sections of the LCD 20 are set in an ON (i.e. visible) state, while in addition the "BATTERY" pattern is set either in a continuously ON state or in a flashing ON/-OFF state, in accordance with the result of a judgement of the battery voltage. This judgement is made by a voltage detection circuit (not shown in the drawings). Furthermore, display command data are such as to produce display of an indication as to whether or not write-in to any of the various memory program areas has been executed. A decision is then made as to whether or not any of the DISC NUMBER "1" through "6" keys has been actuated (step 58). If any of the DISC NUMBER "1" through "6" keys has been actuated, then display command data are such as to produce display of the number of the key which has been act, on the DISC 7-segment display section of the LCD 20 (step 59). If none of the DISC NUMBER "1" through "6" keys has been actuated, then a decision is made as to whether or not any of the TRACK NUMBER "1" through "0" keys has been actuated (step 60). If any of the TRACK NUMBER "1" througn "0" keys has been actuated, display command data are such as to produce display of the number of the actuated key, in the TRACK 7-segment display section of LCD 20 (step 61). If none of the TRACK NUMBER "1" through "0" keys has been actuated, then a decision is made as to whether or not any of the PLAY key, RANDOM PLAY key (reference letter l), or VIDEO PLAY key (reference letter m) of the basic operating keys has been actuated (step 62). If any of the PLAY key, RANDOM PLAY key, or VIDEO PLAY key has been actuated, then display command data are set such as to erase the contents of the DISC 7-segment display section and the TRACK 7-segment display section of LCD 20 (step 63). In addition, a display character code is read out from ROM 17 and is set as display command data such as to display a pattern corresponding to the actuated key, in the 8-character dot display section of LCD 20 (step 64). If it is judged that none of the PLAY key, RANDOM PLAY key, or VIDEO PLAY key has been actuated, then it is assumed that one of the PAUSE key, LEVEL +/− key (reference letter n in FIG. 2), etc. of the other basic operating keys has been actuated, and the the display character code for the actuated key is read out from the ROM 17 and is set as display command data, whereby the pattern corresponding to the actuated key appears in the 8-character dot display section of LCD 20 (step 65). After execution of steps 59, 61, 64 or 65, display command data are such as to produce display of ON/OFF flashing of the transmission pattern of LCD 20 (step 67), the command code corresponding to the actuated key is read out from ROM 17 and is supplied as a command code signal (including the custom code) to the output circuit 12 (step 68). The ON/OFF flashing of the transmission pattern on the LCD 20 can be produced for example by operation of a multivibrator (not shown in the drawings) within drive circuit 30.

If it is judged in step 52 that no key has been actuated, then the portion of the display command data that has been set in step 64 or step 65 is reset (step 69), and the current count value $T_A$ of the 60 seconds timer is incremented by a predetermined amount $T_o$ (step 70).

After executing steps 68 or 70, a decision is made as to whether or not the measured value $T_A$ of the 60 seconds timer has reached 60 seconds or more step 71). If $T_A < 60$ seconds, then execution immediately moves to step 50. If $T_A \geq 60$ seconds, then this is taken as indicating that no new key actuation has occurred since completion of the previous key actuation, by more than 60 seconds, and so execution moves to the Auto-Power Off mode, and all of the display command data are reset to thereby halt display operation by LCD 20 (step 72). Step 50 is then executed. If the Auto-Power Off mode is entered, then the sequence of steps 50, 51, 52, 69, 70, 71 and 72 is executed each time that a timing signal pulse is generated, until a new key actuation occurs. When this is done, the results of steps 69 and 70 are ignored.

The display command data can consist for example of a plurality of bits, with respective ones of the bits corresponding to segments and dots of respective display patterns and display sections of the LCD 20. In this way, changing of a pattern to be displayed can be accomplished by changing the the corresponding bits, i.e. between the 0 and the 1 states. A battery is used as a power source for this embodiment of a remote control transmission apparatus according to the present invention. The first time that a battery is inserted into the apparatus, initial setting of step numbers $S_A$ through $S_J$, (i.e. the maximum values of step numbers which are written in memories A through J respectively) is performed, and the control circuit 9 initiates operation in the normal mode. A battery back-up function for RAM 18 is included in the apparatus, e.g. by means such as a capacitor, so that stored data will be retained during a battery changeover operation, if the duration of the changeover is sufficiently short.

Figure 6A:
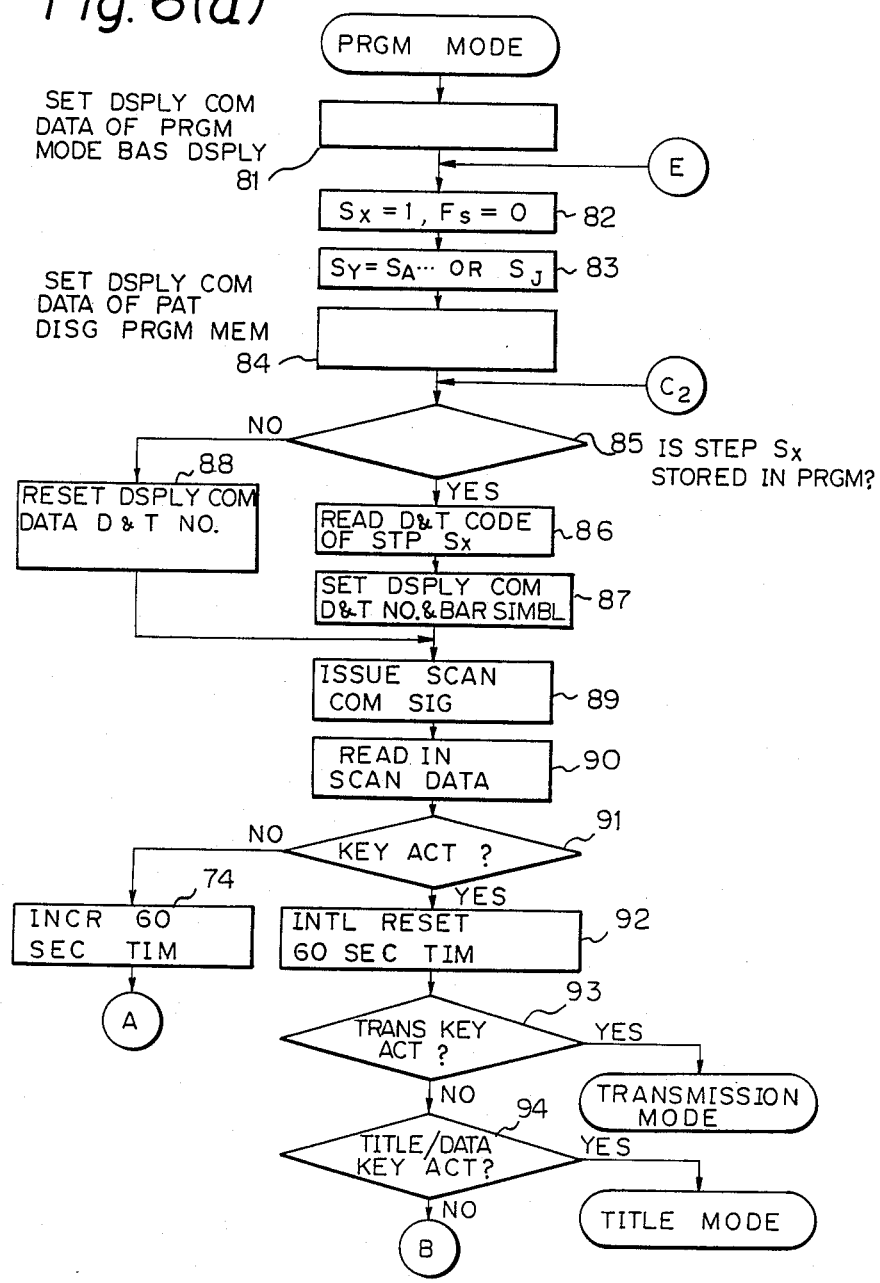
Figure 6B:
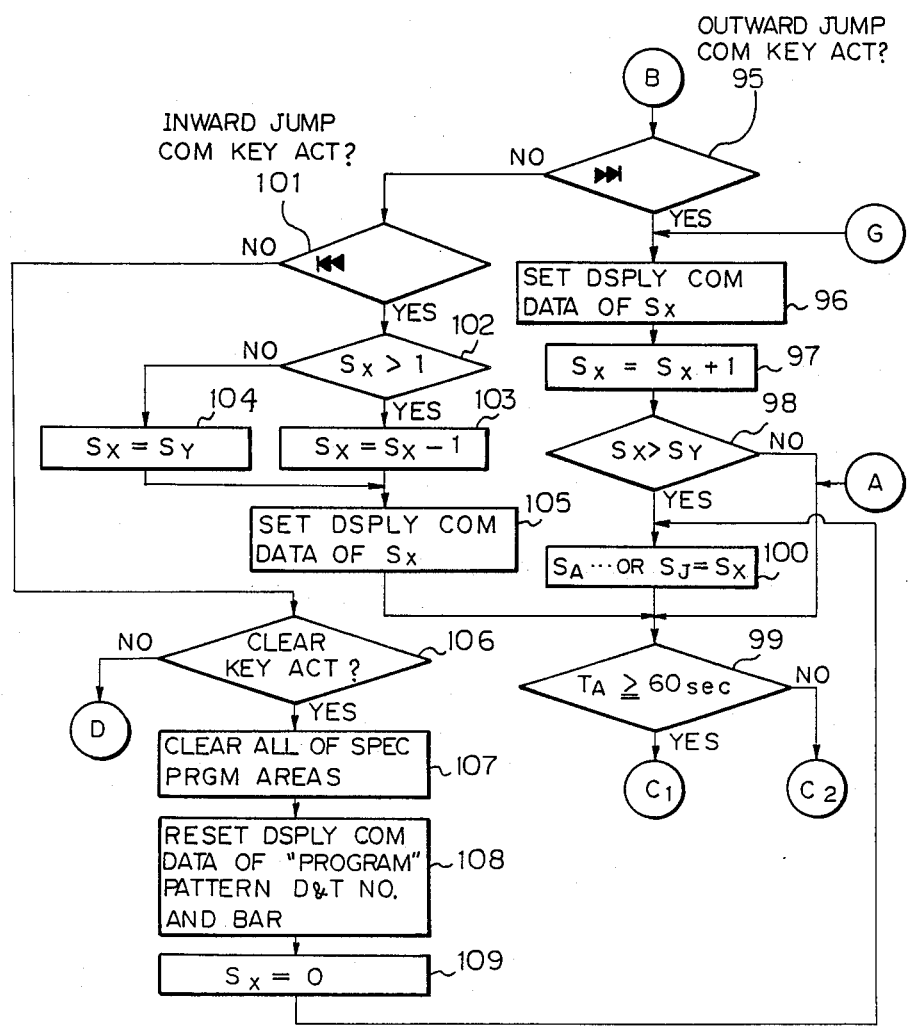
Figure 6C:
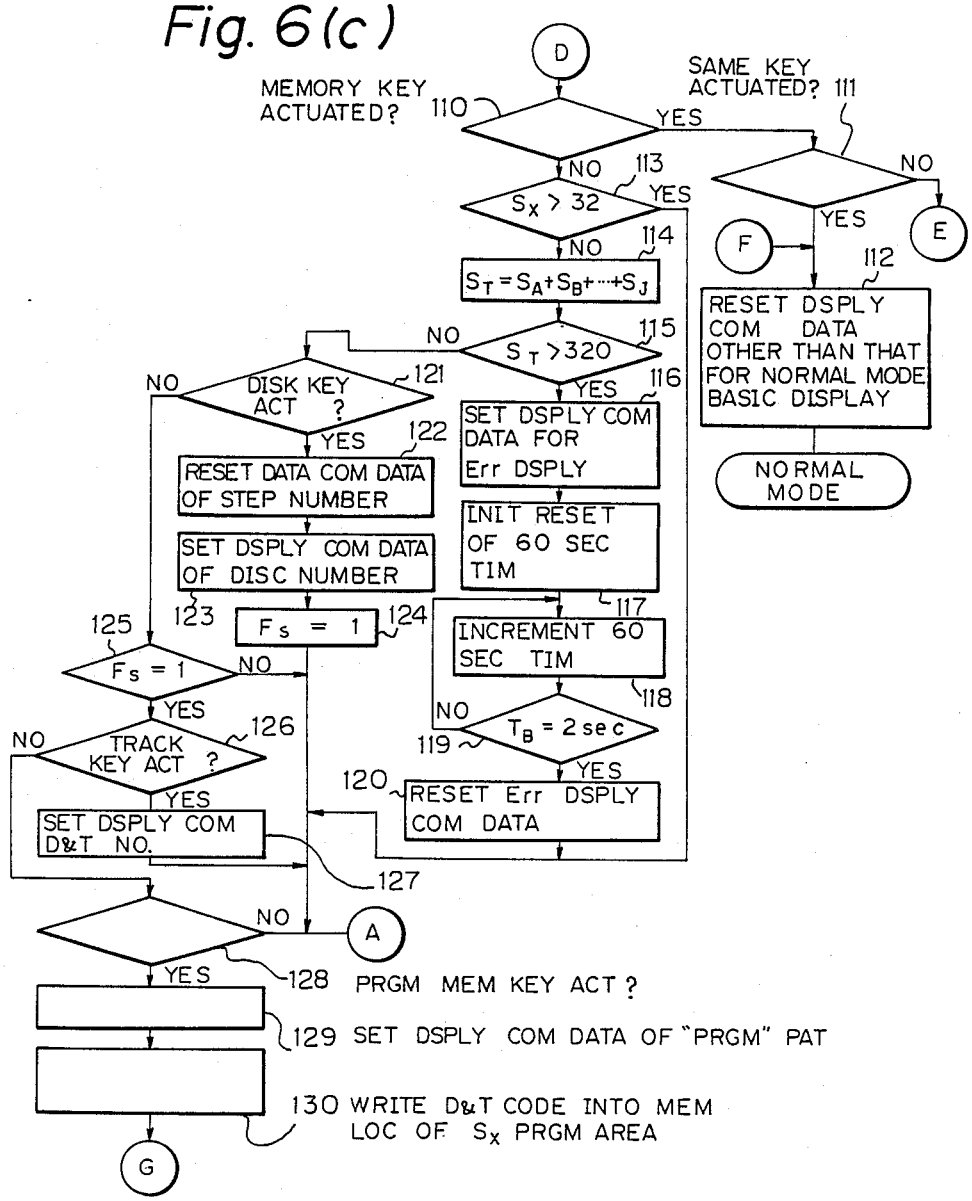

The operation of this embodiment in the program mode will now be described in the following, referring to the flow charts of FIGS. 6(a) through 6(c). Firstly, display command data are set such as to produce the program mode basic display on the LCD 20 (step 81). That is to say, display command data are set whereby the "MEMORY", "DISC" pattern, "TRACK" pattern and the "STEP" pattern of LCD 20 are set in the ON (i.e. visible) state, while in addition display command data are set such that the "BATTERY" pattern is placed in the ON state or in the flashing condition, in accordance with the result of judgement of the battery voltage as described above. Furthermore, if a MEMORY key is actuated and the corresponding memory has title data stored in the title area thereof, then the title data are read out from a buffer memory (not shown in the drawings) and display command data are such as to produce display of the title data in the 8-character dot display section. The step number $S_x$ is then made equal to 1, and the disc set flag Fs is reset to zero (step 82), step number $S_y$ is made equal to the step number (one of the step numbers $S_A$ through $S_J$) of the memory which has been designated by the actuated one of the MEMORY "A" through "J" keys (step 83). Display command data are then set such as to produce display of the symbol pattern of the memory which has been designated by actuation of the MEMORY "A" through "J" keys (step 84). The step number $S_y$ expresses a number of steps which are written in the program area of the memory which has been selected, at the point in time when program mode operation is initiated. In addition, a decision is made as to whether or not a program is already stored at step number $S_x$ i.e. a memory area number of the memory which has been designated by actuation of one of the MEMORY "A" through "J" keys (step 85). If it is judged that a program is stored, then the contents of the step number $S_x$ of the program area of the designated memory (i.e. the disc code and track code) are read out (step 86), and display command data are such as to produce display of a disc number expressing the disc code thus read out, in the DISC 7-segment display section, and to cause the track number that is expressed by the read-out track code to be displayed by the TRACK 7-segment display section, and moreover to produce display of the "PROGRAM" pattern and of a bar segment corresponding to the memory which has been designated (step 87). It is to be noted that the content of the program (i.e. disc number and track number) represent in combination a music piece to be played back when the program mode is selected later on. If it is found in step 85 that there is no program stored at the step number $S_x$, then display command data are such as to produce display of of a "0" in the DISC 7-segment display section and the TRACK 7-segment display section respectively, or the display command data relating to the DISC and TRACK 7-segment display sections are reset (step 88). After execution of steps 87 or 88, a scan command signal is issued to the timing signal generating circuit 6, and output data are read from the data register 11 (step 90). A decision is then made as to whether or not a key has been actuated, based on the contents of the data thus read out (step 91. If it is judged that no key as been actuated, then the current count value $T_A$ of the 60 seconds timer is incremented by the predetermined amount $T_o$ (step 74), and execution then moves to step 99 (described hereinafter). If on the other hand it is judged that a key has been actuated, then initial reset of the 60 second timer is performed (step 92), and a decision is made as to whether or not the TRANS key is actuated (step 93. If it is judged that the TRANS key is actuated, then execution moves to a TRANS mode (described hereinafter). If the TRANS key is not found to be actuated, then a decision is made as to whether or not the TITLE/-DATA key has been actuated (step 94). If the TITLE/-DATA key has been actuated, then execution moves to the title mode, while if the TITLE/DATA key is not found to have been actuated then a decision is made as to whether or not the outward jump command key (designated by reference letter o in FIG. 2) has been actuated (step 95). Actuation of this key serves to generate a command for executing a track jump by the pickup of the CD player, in a radially outward direction. If it is found that the outward jump command key has been actuated, to perform correction or addition to the contents of a program, then display command data are such as to produce display of the step number $S_x$ on the STEP 7-segment display section (step 96), and the step number $S_x$ is incremented by one, with the result being utilized thereafter as a new step number $S_x$ (step 97). A decision is then made as to whether or not this step number $S_x$ is greater than the step number $S_y$ (step 98). If $S_x \leq S_y$, then a decision is made as to whether or not the measured time $T_A$ of the 60 seconds timer has reached 60 seconds or more (step 99). If $S_x \geq S_y$, then since this indicates that the program step number exceeds the step number $S_y$ which has been previously written in, the step number of the designated memory (i.e. selected as one of $S_A$ through $S_J$) is made equal to $S_x$ (step 100). Step 99 is then executed. If it is found in step 99 that $T_A < 60$ seconds, then step 85 is again executed. If $T_A \geq 60$ seconds, then this indicates that 60 seconds or more have elapsed since the last actuation of a key, without a new key act taking place, and so execution moves to step 72 in order to implement Auto-Power Off. The normal mode is then entered. If on the other hand it is found that the outward jump command key has not been actuated, then a decision is made as to whether or not the inward jump command key (reference letter p) has been actuated (step 101). Actuation of this key serves to generate a command for executing a track jump by the pickup of the CD player, in a radially inward direction. If the inward jump command key has been actuated, then a decision is made as to whether or not the step number $S_x$ is greater than one (step 102). If $S_x > 1$, then since this indicates that the step number $S_x$ is equal to 2 or more, one is subtracted from $S_x$, and the result is utilized thereafter as the new value of step number $S_x$ (step 103). If $S_x 23$ 1, then $S_x$ is made equal to the step number $S_y$ (step 104). Display data are then set such as to display the step number $S_x$ on the STEP 7-segment display section (step 105), and step 99 is executed. If it is found that the inward jump command key has not been actuated, then a decision is made as to whether or not the CLEAR key has been actuated (step 106). If it is found that the CLEAR key has been actuated, then the entire program area of the memory corresponding to the actuated one of the MEMORY "A" through "J" keys is cleared (step 107), and the display command data are reset such as to turn OFF (i.e. set in the non-visible state) the "PROGRAM" pattern, the DISC and TRACK 7-segment display sections, and the bar display (step 108). In addition, the step number $S_x$ is made equal to zero (step 109), whereupon step 100 is executed.

If it is found that the CLEAR key has not been actuated, then a decision is made as to whether or not any of the MEMORY "A" through "J" keys has been actuated (step 101). If any of the MEMORY "A" through "J" keys is found to have been actuated, then a decision is made as to whether or not the memory which is designated by the actuated one of the MEMORY "A" through "J" keys is identical to the memory which was designated at the time of transfer to the program mode (step 111. If these are found to be the same memory, then all of the display command data other than data for normal mode display are reset (step 112), then execution returns to the normal mode. If on the other hand the memories are found to be not identical, then step 82 is executed. If none of the MEMORY "A" through "J" keys is found to have been actuated, then a decision is made as to whether or not the step number $S_x$ is greater than 32 (this is is done in order to limit the step number of the program area of each memory to a maximum of 32) (step 113). If step number $S_x > 32$, then a decision is made as to whether or not the measured time $T_A$ of the 60 seconds timer has reached 60 seconds (step 99). If step number $S_x \leq 32$, then the respective step numbers $S_A$ through $S_J$ of the prrograms which are stored in memories A through J respectively, are added together, to obtain a total number $S_T$ (step 114). A decision is then made as to whether or not the total number $S_T$ is greater than 320 (this being done in order to limit the total number of steps of the memories A through B to 320 or less) (step 115). IF $S_T > 320$, then display command data are such as to produce display of "E" in the DISC 7-segment display section of LCD 20, and "R" in the TRACK 7-segment display section (step 116), initial reset of a 2 seconds timer is performed (step 117, and the count value $T_B$ of the 2 seconds timer is incremented by a predetermined amount (step 118). A decision is then made as to whether or not the count value $T_B$ of the 2 seconds timer has reached 2 seconds (step 119).

If $T_B < 2$ seconds, then step 118 is executed, while if $T_B = 2$ seconds, the portion of the display command data which was set in step 116 is reset (step 120), and step 99 is executed.

If $S_T \leq 320$, then a decision is made as to whether or not any of the DISC NUMBER "1" through "6" keys has been actuated (step 121). If any of the DISC NUMBER "1" through "6" keys has been actuated, then the display command data are reset to thereby terminate display of the step number $S_x$ in the STEP 7-segment display section (step 122), display command data are set such as to display, in the DISC 7-segment display section, a disc number which is expressed by the disc code obtained from the scan data (step 123), and the "disc set" flag $F_s$ is set to the "1" state (step 124). Step 99 is then executed. If none of the DISC NUMBER "1" through "6" keys has been actuated, then a decision is made as to whether or not the "disc set" flag $F_s$ is in the 1 state (step 125). If $F_s \neq 1$, then step 99 is executed, while if $F_s = 1$, then a decision is made as to whether or not any of the TRACK NUMBER "1" through "0" keys has been actuated (step 126). If it is found that any of the TRACK NUMBER "1" through "0" keys has been actuated, then display command data are set such as display in the TRACK 7-segment display section a track number which is expressed by the track code obtained from the scan data (step 127), and step 99 is then executed. If none of the TRACK NUMBER "1" through "0" keys has been actuated, then a decision is made as to whether or not the PROGRAM MEMORY key has been actuated (step 128). If it is found that the PROGRAM MEMORY key has been actuated, then display command data are such as to produce display of the program pattern of LCD 20 (step 129), and the disc code and track code are written into memory locations which are designated by the step number $S_x$ of the memory that corresponds to the actuated one of the MEMORY "A" through "J" keys (step 139). Step 96 is then executed. If it is found that the PROGRAM MEMORY key has not been actuated, then this indicates that a key has been actuated which has no relation to the program mode, and so step 99 is executed.

Operation in the TRANS mode will now be described, referring to FIG. 7. First, based upon the step numbers $S_A$ through $S_J$, a decision is made as to whether or not a program is stored in the memory that is designated by the one of the MEMORY "A" through "J" keys that has been actuated (step 131). If it is found that no program is stored, then step 112 is executed and operation then returns to the normal mode. If a program is found to be stored, then since the program can be transmitted to the CD player display command data are such as to produce display of the transmission pattern of LCD 20 by ON/OFF flashing (step 132), and the command code signal for the STOP code is supplied to the output circuit 12 (step 133). The command code signal for the CLEAR code is then supplied to the output circuit 12 (step 134). As a result of transmitting the STOP code, if the CD player is currently in a playing operating status, then playing operation is halted. Furthermore as a result of transmitting the CLEAR code, the program memory of the CD player is set in the clear state. The step number $S_x$ is then made equal to one (step 135), and the disc code and track code are read out from the memory location that is designated by step number $S_x$, from the program area of the memory which is designated by the actuated one of the MEMORY "A" through "J" keys (step 136). Display command data are then set such as to display the track number and the disc number that are respectively expressed by the track code and the disc code which are read out, and the step number $S_x$, in the respective 7-segment display sections (step 137). The disc code and track code which have been thus read out, together with a program code (which serves to command write-in to the program memory of the CD player), are sequentially supplied to the output circuit 12 as respective command code signals (step 138). One is then added to the step number $S_x$, and the result is used thereafter as the new step number $S_x$ (step 139). A decision is then made as to whether or not this step number $S_x$ is greater than the step number (i.e. one of $S_A$ through $S_J$) of the memory which has been designated by the actuated one of the MEMORY "A" through "J" keys (step 140). If the step number $S_x$ is equal to or smaller than the step number of the designated program memory, then a scan command signal is supplied to the timing signal generating circuit 6 (step 141). The output data from the data register 11 are then read in (step 142), and a decision is made as to whether or not any of the PLAY key, RANDOM PLAY key, or VIDEO PLAY key has been actuated, based based upon the contents of that output data (step 143). If any of the PLAY key, RANDOM PLAY key, or VIDEO PLAY key has been actuated, then display command data are such as to produce display of a pattern corresponding to the actuated key, in the 8-character dot display section of LCD 20 (step 44). In addition, the command code of the actuated key is stored as the latest transmission code (step 145). Step 136 is then executed again. If it is found in step 140 that the step number $S_x$ is greater than the specified number, then since this indicates that transmission of the progaam has been completed, the latest transmission code to be stored is supplied as an end-of-transmission code signal to the output circuit 12 (step 146). Step 112 is then executed, and operation returns to the normal mode.

Figure 8:
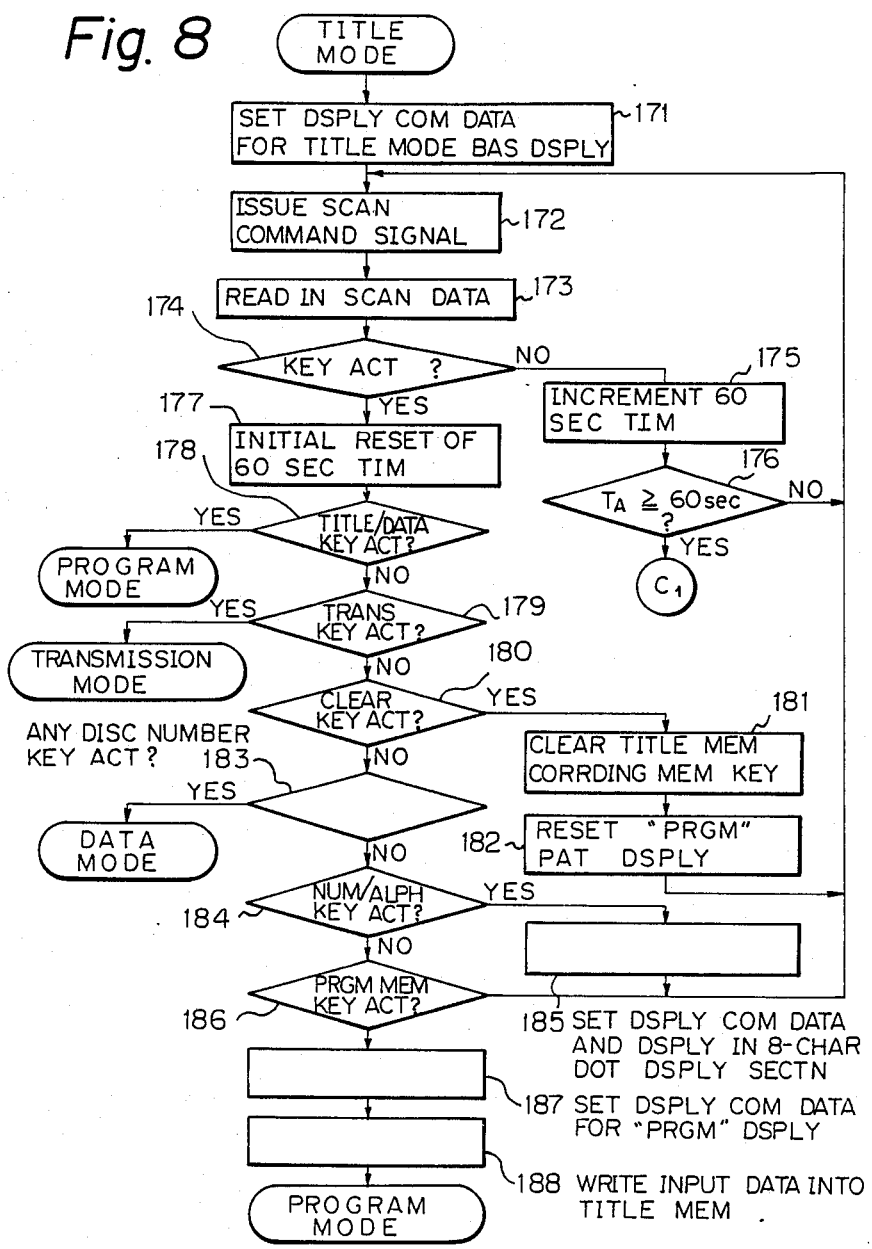

The operation in the title mode will now be described, referring to FIG. 8. Firstly, the displays produced on the DISC 7-segment display section and the TRACK 7-segment display section of LCD 20 are terminated (i.e. set OFF), and display command data for the title basic display are set, whereby the "TITLE" pattern is displayed. Next, a scan code signal is sent to the timing signal generating circuit 6 (step 172), and the output data from data register 11 are read in (step 173). A decision is then made as to whether or not a key has been actuated, based on the contents of this data (step 174). If it is found that no key has been actuated, then the measured value $T_A$ of the 60 seconds timer is incremented by the predetermined amount $T_o$ (step 175). A decision is then made as to whether or not the measured value $T_A$ has become greater than 60 seconds (step 176). If $T_A < 60$ seconds, then step 172 is executed, while if $T_A \geqq 60$ seconds then execution moves to step 72. If on the other hand it is found that a key has been actuated, then initial reset of the 60 seconds timer is performed (step 177), and a decision is made as to whether or not the TITLE/DATA key has been actuated (step 178). If the TITLE/DATA key has been actuated, then operation returns to the program mode, while if the TITLE/DATA key has not been actuated, then a decision is made as to whether or not the TRANS key has been actuated (step 179). If the TRANS key has been actuated, then operation moves to the TRANS mode. If the TRANS key has not been actuated, then a decision is made as to whether or not the CLEAR key has been actuated (step 180). If the CLEAR key has been actuated, then the memory locations of the title area of the memory which corresponds to the actuated one of the MEMORY "A" through "J" keys is cleared (step 181), and display command data are set such as to terminate display of the "PROGRAM" pattern (step 182). Execution then moves to step 172.

If the CLEAR key has not been actuated, then a decision is made as to whether or not any of the DISC NUMBER "1" through "6" keys has been actuated (step 183). If any of the DISC NUMBER "1" through "6" keys has been actuated, then execution moves to the data mode. However this will take place only if one of the MEMORY "A" through "J" keys has been actuated, and the program mode entered. If none of the DISC NUMBER "1" through "6" keys is found to be actuated, then a decision is made as to whether or not any of the TRACK NUMBER "1" through "0" keys numeric keys, the MEMORY "A" through "J" keys alphabetic letter keys, or alphabetic letter keys which form part of the basic operating keys, has been actuated (step 184). If a numeric key or alphabetic key is found to have been actuated, then the display character code of the corresponding numeral or alphabetic letter is read out from ROM 17 and set as display command data, display the numeral or alphabetic letter on the 8-character dot display section of LCD 20. Execution then moves to step 172. As title data are successively formed in the buffer memory, by repetitively actuating numeric or alphabetic letter keys, the title data are at the same time supplied to the 8-character dot display section to be displayed thereby. If it is found in step 184 that no numeric key or alphabetic key has been actuated, then a decision is made as to whether or not the PROGRAM MEMORY key has been actuated (step 186). If it is found that the PROGRAM MEMORY key has been actuated, then display command data are such as to produce display of the "PROGRAM" pattern of the LCD 20 (step 187), and the title data which have been inputted by actuations of the numeric and alphabetic keys and stored temporarily in the buffer memory, are written into the title area which corresponds to the one of MEMORY "A" through "J" keys that has been actuated (step 188). Operation then returns to the program mode.

Figure 9:
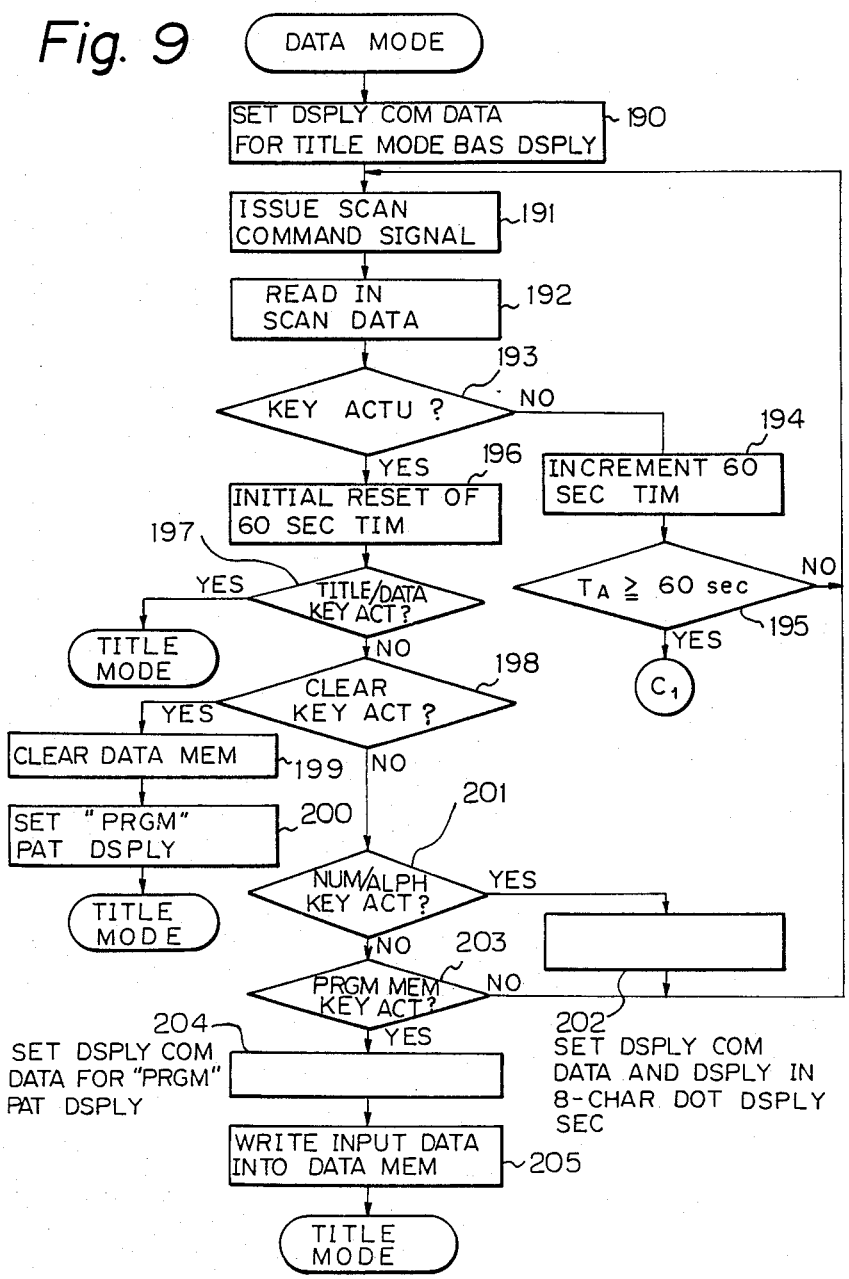
Figure 11:
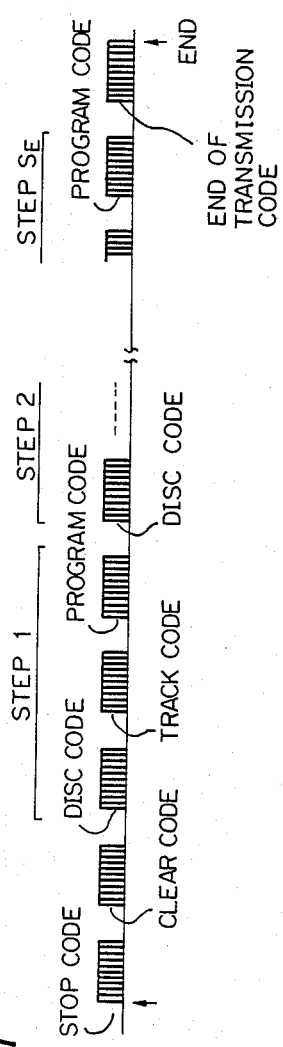
FIG. 11 is a diagram to illustrate a process of program transmission.

If operation moves to the data mode in step 183, then as shown in FIG. 9, the display of the "TITLE" pattern is terminated, and display command data for basic mode display are set for producing a display of the "DATA" pattern (step 190). If data are already stored in the data area of the memory which is designated in step 190, then those data are read out to the buffer memory and display command data are set such as display these data on the 8-character dot display section of LCD 20. Operation then moves to step 191, and operations to detect the next key actuation are executed. Steps 191 through 197 are respectively identical to the title mode steps 172 through 178, and so further description will be omitted. If it is judged in step 197 that the TITLE/DATA key has been actuated, then operation returns to the title mode, while if it judged that the TITLE/DATA key has not been actuated, then a decision is made as to whether or not the CLEAR key has been actuated (step 198). If the CLEAR key has been actuated, then all of the storage locations of the data area of the memory corresponding to the one of MEMORY "A" through "J" keys which has been depressed, are cleared (step 199), and display command data are set such as to terminate the display of the "PROGRAM" pattern by LCD 20 (step 200). Operation then returns to the title mode. If the CLEAR key is judged not to have been actuated, then a decision is made as to whether or not a numeric key or alphabetic key has been actuated (step 201). If it is judged that a numeric key or alphabetic key has been actuated, then the display character code of the pattern corresponding to the actuated key is read out from ROM 17, and is set as display command data for displaying the numeral or letter by the 8-character dot display section of LCD 20 (step 202). Operation then moves to step 191. By repetitively actuating numeric keys or alphabetic keys in this way, data representing the successively inputted numerals or letters are temporarily stored in the buffer memory, and at the same time are displayed by the 8-character dot display section. If none of the numeric keys or alphabetic keys is found to have been actuated in step 201, then a decision is made as to whether or not the PROGRAM MEMORY key has been actuated (step 203). If it is judged that the PROGRAM MEMORY key has been actuated, then display command data are such as to produce display of of the "PROGRAM" pattern of LCD 20 (step 204), and the data which have been inputted by successive actuations of numeric keys or alphabetic keys and held in the buffer memory, are written into memory locations of the data area which is specified by the actuated one of the MEMORY "A" through "J" keys and DISC NUMBER "1" through "6" keys (step 205). Operation then returns to the title mode.

With this embodiment of a remote control transmission apparatus according to the present invention, in the initial status of the normal mode (as illustrated in FIG. 10(a)), only the "MEMORY" pattern, the "DISC" pattern, the "TRACK" pattern and the "BATTERY" pattern are displayed by LCD 20. Any program memories which have program information or data stored therein are respectively indicated by bar display symbols. In the example of FIG. 10(a), program information or data are stored in mempories A and G.

If a DISC NUMBER key is acted during operation in the normal mode, then the disc number corresponding to the actuated key is displayed in the DISC 7-segment display section of LCD 20, while at the same time the transmission pattern is set in the flashing display state, and a command code signal is read out from ROM 17 and transferred through the output circuit 12 to the LED 13 to be transmitted thereby If a TRACK NUMBER key is then actuated, then the number of the actuated key is displayed in the TRACK 7-segment display section of LCD 20, while at the same time the transmission pattern is set in the flashing display state, and a command code signal is read out from ROM 17 to be transmitted by the LED 13. If for example the DISC NUMBER 6 key is actuated, then the display shown in FIG. 10(b1) will be produced If the TRACK NUMBER 3 key is then actuated, then the display shown in FIG. 10(c) will be produced. If the PLAY key is now actuated, then as shown in FIG. 10(d), a "PLAY" indication will appear in the 8-character dot display section, and a command code signal designating that playing is to be initiated is read out from ROM 17 and transmitted to the CD player by LED 13. After completion of this transmission, the LCD 20 display returns to the initial status, i.e. as shown in FIG. 10(a).

If a basic operating key, the PROGRAM MEMORY key, or the CLEAR key is actuated during operation in the normal mode, then the actuated key is displayed in the 8-character dot display section. The PROGRAM MEMORY key is displayed in the form "PROGRAM", the RANDOM PLAY key as "R-PLAY" and the VIDEO PLAY key as "V-PLAY", in the 8-character dot display section.

In the normal mode, if any of the MEMORY "A" through "J" keys is actuated, then the program mode is entered. In this mode, inputting of a program can be performed. In the program mode, the "MEMORY" pattern, the "DISC" pattern, the "TRACK" pattern and the "BATTERY" pattern are displayed on LCD 20, while in addition the letter corresponding to the actuated key is displayed. If for example the MEMORY E is actuated, then the "MEMORY" pattern will appear on LCD 20 with the letter "E" displayed immediately below. As an example of inputting a program, if the DISC NUMBER "6" key is actuated, then the numeral 6 will appear in the DISC 7-segment display section of LCD 20. If the TRACK NUMBER "4" key is then actuated, the numeral 4 will appear in the TRACK 7-segment display section of LCD 20. When this occurs, the disc code and track code of the actuated keys are read out from ROM 17 and held in a register within the control circuit 9. By then actuating the PROGRAM MEMORY key, the disc code expressing the numeral 6 and track code expressing the numeral 4 are stored in memory locations of a program area which is designated as step 1 of memory E in RAM 18. The "PROGRAM" pattern will now be displayed on LCD 20, with a bar symbol appearing below the "E" pattern, while in addition the numeral "1" is displayed in the STEP 7-segment display section. By repetitions of the above operations, disc codes and track codes can be sequentially stored in memory locations which are designated as step 2, step 3, . . . of memory E. For example if after the DISC NUMBER "6" key has been actuated it is desired to establish a program for a different track of disc 6, then since the disc code for disc 6 is held in a register within control circuit 9, it is not necessary to again actuate the DISC NUMBER "6" key, and the program can be established simply by actuating the TRACK NUMBER "1" through "0" keys and the PROGRAM MEMORY key. The same is true for any other discs. Upon completion of program input in this way, the user actuates the TRANS key, whereby firstly a stop code and a clear code are generated and transmitted as command code signals, by optical transmission, then the disc code and track code are read out from the memory location designated as step 1 of memory E to be optically transmitted (together with a program code as described above) as respective command code signals, and thereafter disc codes and track codes are successively read out from step 2, step 3, . . . up to step $S_E$, and are optically transmitted as command code signals. When all of the program stored in memory E has been transmitted, operation returns to the normal mode.

Furthermore if for example disc code and track code program data have previously been written into memory A, and the MEMORY "A" key is actuated followed by actuation of the TRANS key, then the disc codes and track codes stored in memory A will be read out and optically transmitted as described above.

Assuming now that disc code and track code program data have already been stored in memory E as described above, and that the apparatus is operating in the normal mode, then actuation of the MEMORY "E" key will result in the "MEMORY" pattern, "STEP" pattern, "DISC" pattern, "TRACK" pattern, "PROGRAM" pattern and "BATTERY" pattern of LCD 20 being displayed, while in addition the letter "E" will appear immediately below the "MEMORY" pattern, with a bar symbol appearing below that letter "E". In addition, the numeral "6" will appear in the DISC 7-segment display section, and numeral "4" will appear in the TRACK 7-segment display section. If the outward jump command key is then actuated, then numeral "1" will appear in the STEP 7-segment display section. If the DISC NUMBER "5" key, the TRACK NUMBER "4" key, and the PROGRAM MEMORY key are then actuted so quentially, the program which has been stored with a disc code expressing the number 5 and a track code expressing the number 4 will be amended, and the amended program will be stored in a memory location designated as step 1 of memory E. If now the outward jump command key is again actuated, then the numeral "2" will appear in the STEP 7-segment display section, and numerals expressed by the disc code and track code that have been written into step 2 of memory E will appear in the DISC 7-segment display section and the TRACK 7-segment display section respectively. In this way, the step number is incremented each time that the outward jump command key is actuated, and the disc number and track number stored at that step are displayed in the DISC and TRACK 7-segment display sections respectively. Furthermore each time that the inward jump command key is actuated, the step number is decremented by one, and numerals expressed by the disc code and track code of the newly selected step become displayed in the DISC and TRACK 7-segment display sections respectively.

If now it is desired to store an additional program portion, in a step of memory E having a step number that is greater than step number $S_E$ (which has a program already written therein) by one, then this can be accomplished by actuating the outward jump command key to reach the requisite step number, then actuating the appropriate ones of the DISC NUMBER and TRACK NUMBER keys, and finally actuating the PROGRAM MEMORY key.

During operation in the normal mode, with disc code and track code data already written into memory E as described above, if the CLEAR key is actuated after actuating the MEMORY "E" key, then all of the program which has been written into the program area of memory E will be erased.

Figure 12:
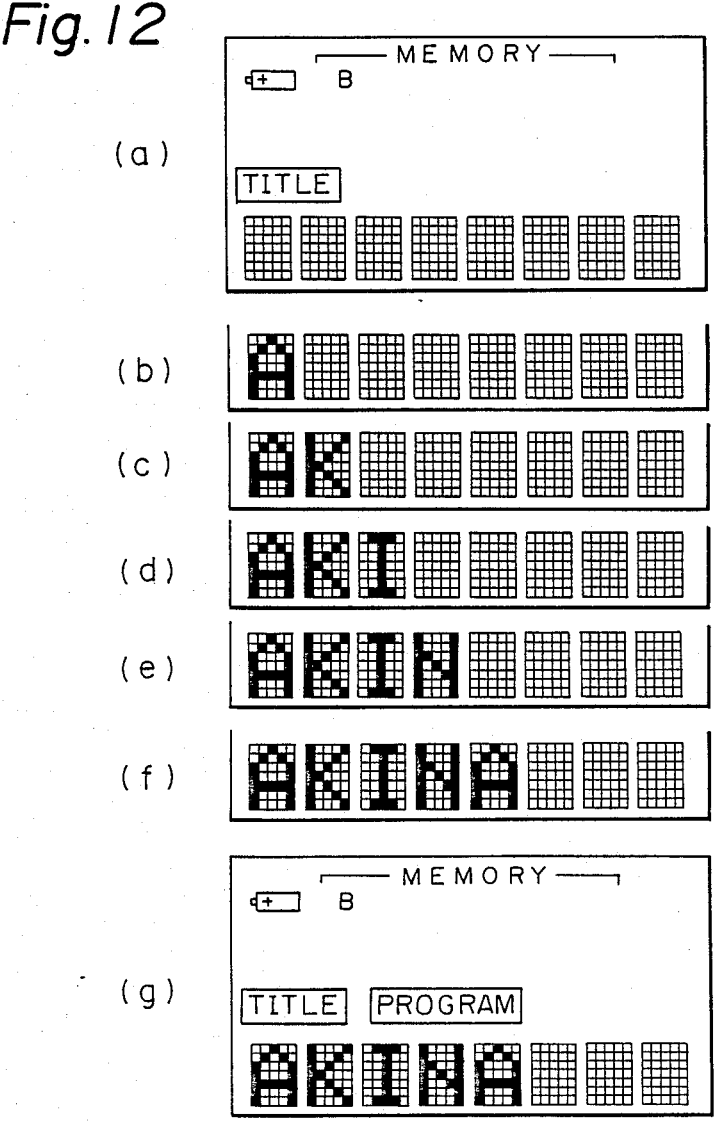

Next, with the apparatus operating in the normal mode, if the MEMORY "B" key is actuated to enter the program mode and the TITLE/DATA key is then actuated, the title mode will be entered. The appearance of the display when the title mode is entered is as shown in FIG. 12(a), with a "TITLE" pattern being displayed. As an exmple, storage of a title "AKINA" in the title area of memory B will be described. In this case, the MEMORY "B" key, the PLAY key (which is also the alphabetic letter "K" key), the MEMORY "I" key, the RANDOM PLAY key (which is also the alphabetic letter "N" key), and the MEMORY "A" key must be successively actuated. As a result, as shown in FIGS. 12(b) through 12(f), a first character "A", a second character "K", a third character "I", a fourth character "N" and a fifth character "A" will be successively displayed, from the left, in the 8-character dot display section of LCD 20, with the displayed letters being temporarily stored in the buffer memory. By then actuating the PROGRAM MEMORY key, the "PROGRAM" pattern will be displayed (as shown in FIG. 12(g)), and the title data "AKINA" will be written into the title area of memory B from the buffer memory. Operation then returns to the program mode.

When the program mode is entered, the display produced by LCD 20 is as shown in FIG. 13(a). If for example the DISC NUMBER "1" key is then actuated, the data mode is entered and the display becomes as shown in FIG. 13(b), with the "DISC" pattern and the "DATA" pattern appearing, and with a numeral "1" displayed in the DISC 7-segment display section. If now for example the data "CRIMSON" are to be stored in the data memory, then this is performed by successively actuating the MEMORY "C" key, the TIME key (which is also the alphabetic "R" key), the MEMORY "I" key, the STOP key, (which is also the alphabetic "M" key), the REPEAT key (which is also the alphabetic "S" key), the VIDEO PLAY key (which is also the alphabetic "O" key), and the RANDOM PLAY key. As a result, as shown in FIG. 13(c), "CRIMSON" will be displayed in the 8-character dot display section, and the corresponding data are temporarily held in the buffer memory. If now the PROGRAM MEMORY key is actuated, then as shown in FIG. 13(d), the "PROGRAM" pattern will be displayed and the data representing "CRIMSON" will be written into the first data area of memory B from the buffer memory. Operation then returns to the title mode.

If the CLEAR key is actuated during operation in the title mode, the contents of the title area of the memory which is currently selected will be erased, and operation will continue in the title mode. Furthermore, if the CLEAR key is actuated during operation in the data mode, the contents of all of the data area of the memory which is currently selected will be erased, and operation will go to the title mode.

Correction or alteration of data stored in a title area or data area is performed by first actuating the CLEAR key, to clear each of the memory areas in question, and then executing input operations as described above. Alternatively, the apparatus can be set in title mode or in data mode operation, and data input performed, to thereby overwrite any previously data which have been previously inputted.

Figure 14:
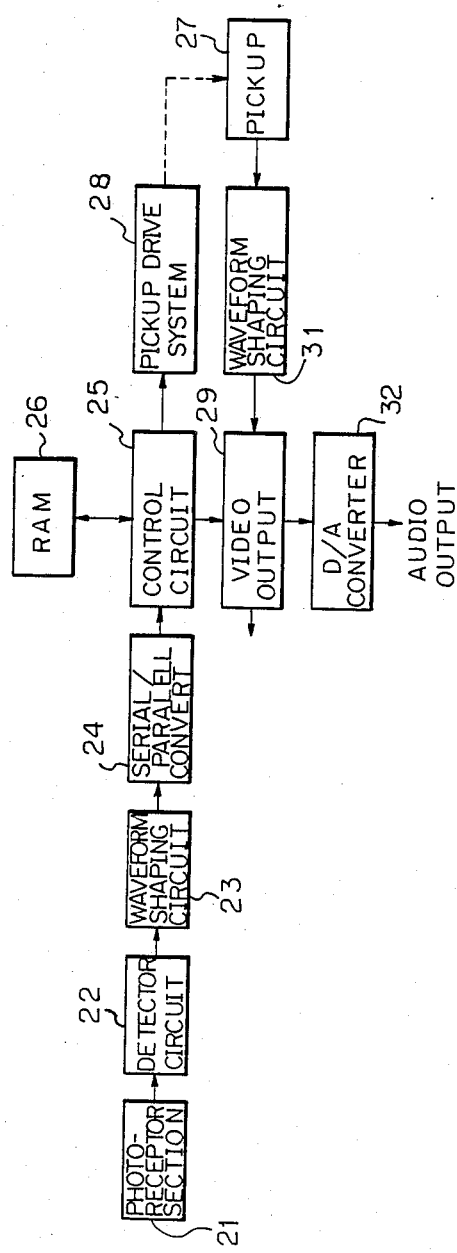
FIG. 14 is a block circuit diagram showing the general configuration of a CD player.

In the controlled CD player, as shown in FIG. 14, command signals which have been transmitted from the remote control transmission apparatus are received by a photo-receptor section 21, to be converted to electrical signals and supplied to a detector circuit 22. The detector circuit 22 performs demodulation of the signal from photoreceptor section 21, to obtain a serial data signal. The resultant output signal from detector circuit 22 is transferred through a waveform shaping circuit 23 to a serial/parallel converter circuit 24, whereby the waveform-shaped serial data signal is converted into a parallel data signal formed of a plurality of bits. This parallel data signal is supplied as a command code signal to a control circuit 25, which is formed of a microprocessor. The control circuit 25 is connected to a RAM 26, which stores programs, to a pickup drive system 28 which drives a pickup 27, and to a signal processing circuit 29. The signal processing circuit 29 receives a signal produced from the pickup 27, after the signal has been transferred through a waveform shaping circuit 31, and thereby derives a digital audio signal, a video signal, and control signal. The digital audio signal is supplied to a D/A converter 32, and the control signal is supplied to the control circuit 25.

Figure 15:
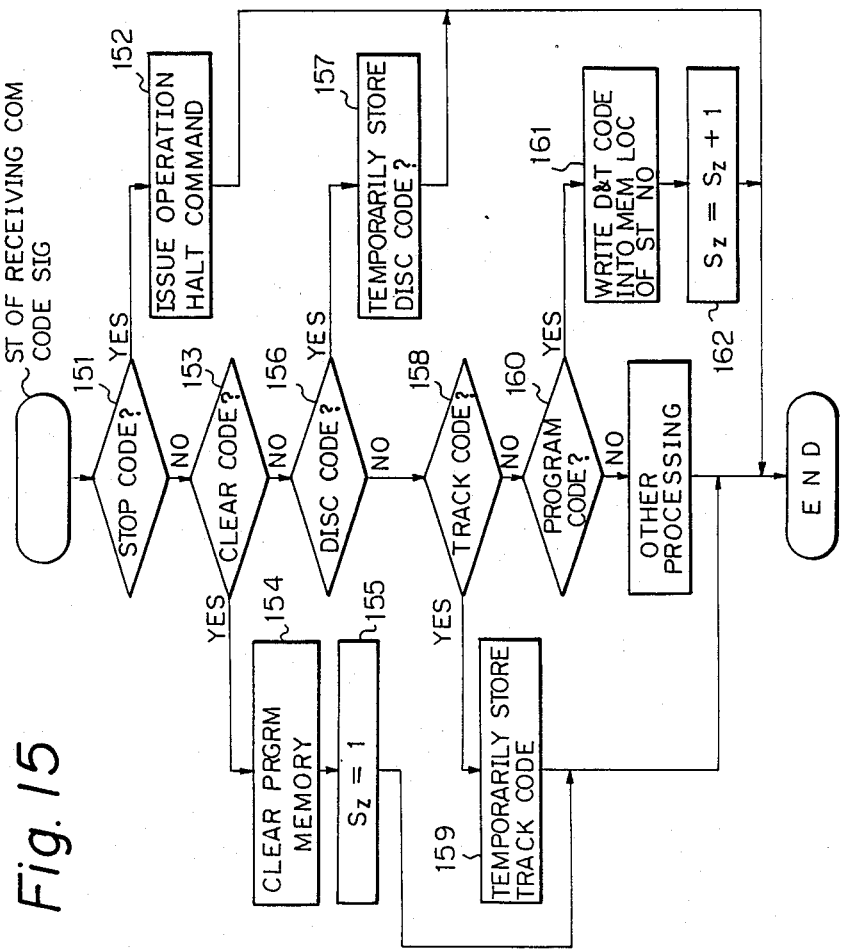
FIG. 15 is a flow chart for assistance in describing the operation of a control circuit in the CD player of FIG. 14.

The flow of processing operations which are performed by the control circuit 25 on a received program will be described referring to the flow chart of FIG. 15. Each time that a signal is received from the serial/parallel converter circuit 24, the control circuit 25 first judges whether or not the received signal is a stop code signal. If the signal is found to be a stop code signal, then an operation halt command is generated and supplied to the pickup drive system 28 (step 152). If it is judged that the signal does not represent a stop code, then a decision is made as to whether or not the signal represents a clear code (step 153, and if it is judged that a clear code has been received, a program memory within the RAM 26 is cleared (step 154), and a step number $S_z$ is made equal to one (step 155). If it is judged that the signal does not represent a clear code, then a decision is made as to whether or not the signal represents a disc code (step 156. If it is found to be a disc code, then that code is temporarily stored (step 157), and if not, then a decision is made as to whether or not the signal represent a track code (step 158). If the signal is judged to represent a track code, then that track code is temporarily stored (step 159). f it is judged that the signal does not represent a track code, then a decision is made as to whether or not the signal represents a program code (step 160), and if it is found to represent a program code, then the temporarily stored disc code and track code are written into memory locations in a program memory which is specified by the number $S_z$ (step 161). One is then added to the step number $S_z$, and the result is used thereafter as the new step number $S_z$ (step 162). If the received signal is not found to represent a program code, then other processing is executed. By successive repetitions of the operations described above, program data wich are transmitted from the remote control transmission apparatus become stored in the program memory within RAM 26, in units of steps.

In the embodiment of the present invention described above, numerals and alphabetic letters can be displayed by the remote control transmission apparatus. However it should be noted that the invention is not limited to this, and that it would be equally possible to arrange for displaying Japanese katakana or kanji characters, or other types of character.

Furthermore with the above embodiment, the invention is utilized with a magazine type of CD player. However the present invention is not limited to such an application, and is equally applicable to a data recording medium playing apparatus such as a CD player which can only have a single disc set therein at one time. In this case it will of course be unnecessary to specify a disc number when specifying a musical item which is to be played, or when storing a program. Thus in this case, the DISC NUMBER "1" through "6" keys shown in FIG. 2, and the "DISC" pattern and DISC 7-segment display section (P14 shown in FIG. 4) need not be included. It should also be noted that a remote control transmission apparatus according to the present invention is not limited in application to a CD player as in the case of the described embodiment, but for example could be applied to such other types of controlled apparatus as video disc players, video tape recorders (VTRs), television receivers, etc. In the case of a remote control transmission apparatus for a television receiver, the names of television stations and of television broadcast programs, etc, can be stored in memory, and displayed as required.

Furthermore with the embodiment of the present invention described above, data can only be written into the memories A through E, when operating in the data mode. However it would be equally possible to arrange that data can be written into all of the memories A through J. Furthermore, the data areas of the memories can be provided separately from the program areas.

From the above description it can be understood that a remote control transmission apparatus according to the present invention is provided with display elements capable of displaying character patterns and has a capability for storing in memory data which are displayed by the display elements, and moreover has a capability for reading out arbitrary parts of the stored data by actuation of keys, and displaying the data thus read out on the display elements. Thus when a key is actuated, a character or numeral corresponding to the actuated key can be displayed. In addition when the apparatus is used to control a data recording medium playing apparatus, data representing the titles of recorded contents of data media such as recording discs can be stored in memory by the remote control transmission apparatus. In particular, if a program which expresses a playing sequence is stored in memory, then by also storing in memory data which represent a title or the name of a musical items, etc, contained in the sequence specified by the program, it can easily be confirmed that a desired program has been correctly selected.

Furthermore when the remote control transmission apparatus is used to control a magazine type of playing apparatus such as a magazine type of CD player in the case of the preferred embodiment, whereby a plurality of recording media such as recording discs can be selectively played, then the titles of the respective discs and of their contents can be stored in the memory of the remote control transmission apparatus. Hence, the title of a recording disc can be easily confirmed while the disc is being played. As a result, the invention provides great ease and freedom of use.

Moreover since it is not necessary for data to be received from the controlled apparatus, i.e. only one-way data transmission need be executed, the invention provides the further advantages of basic simplicity of construction and low cost of manufacture.

What is claimed is:

1. A remote control transmission apparatus provided with a plurality of key-actuated switches for executing remote operation of a controlled apparatus, comprising a plurality of display elements capable of displaying at least characters arranged as a character pattern on said remote control apparatus, designation means for designating display data which are to be displayed by said display elements, memory means for storing display data which are designated by said designation means, and drive means for reading out, in accordance with actuation of said switches, stored data from said memory means and for displaying the data by said display elements.

2. A remote control transmission apparatus according to claim 1, in which said remote control transmission apparatus is powered by a battery, and in which said memory means comprises a back-up function whereby data stored in said memory means are held stored therein for a predetermined time following removal of said battery.

3. A remote control transmission apparatus for executing remote operation of a data recording medium playing apparatus, comprising command means for commanding program data which express track numbers of a plurality of groups of data which are recorded on a data recording medium, memory means having at least one program storage area, designation means for designating program storage areas of said memory means, write-in means for executing write-in of program data designated by said command means to program storage areas which are designated by said designation means, and transmission means for executing read-out in response to transmission commands of program data which have been written into program storage areas as designated by said designation means and for transmitting said data to said data recording medium playing apparatus.

4. A remote control transmission apparatus provided with a plurality of key-actuatable switches, operable by actuation of said switches for generating and transmitting command code signals representing respective command codes to a recorded data playing apparatus, said recorded data playing apparatus being responsive to respective ones of said command code signals for executing corresponding predetermined operations, said remote control transmission apparatus being characterized in further comprising memory means for storing data which are produced in response to actuations of said switches, with said data comprising at least said command codes, display means for displaying said data in response to said actuations, and drive means responsive to predetermined actuations of said switches for selectively reading out said data stored in said memory and driving said display means to display said data.

5. A remote control transmission apparatus provided with a plurality of key-actuatable switches, operable by actuation of said switches for generating and transmitting command code signals representing respective command codes to a recorded data playing apparatus, said recorded data playing apparatus being responsive to respective ones of said command code signals for executing corresponding predetermined operations, said remote control transmission apparatus being characterized in further comprising memory means for storing data which are produced in response to actuations of said switches, with said data comprising at least said command codes, display means for displaying said data in response to said actuations, and drive means responsive to predetermined actuations of said switches for selectively reading out said data stored in said memory and driving said display means to display said data in which said command codes comprise information designating playing of respective predetermined portions of a data recording medium which is mounted on said recorded data playing apparatus to be played thereby.

6. A remote control transmission apparatus according to claim 5, in which said data further comprise a plurality of sets of information respectively indicative of said predetermined portions.

7. A remote control transmission apparatus according to claim 6, in which said sets of information respectively represent titles of items which are recorded on said data recording medium.

8. A remote control transmission apparatus according to claim 5, in which said data recording medium is a recording disc, and in which said predetermined portions respectively correspond to recording tracks of said disc.

9. A remote control transmission apparatus according to claim 5, in which said recorded data playing apparatus is a magazine type of recording disc playback apparatus which is capable of selectively playing a plurality of recording discs mounted thereon, and in which each of said predetermined portions corresponds to a specific recording track of a specific one of said recording discs.

10. A remote control transmission apparatus for executing remote operation of a data recording medium playing apparatus, comprising command means for commanding program data which express track numbers of a plurality of groups of data which are recorded on a data recording medium, memory means having a plurality of program storage areas, designation means for designating program storage areas of said memory means, write-in means for executing write-in of program data designated by said command means to program storage areas which are designated by said designation means, and transmission means for executing read-out in response to transmission commands of program data which have been written into program storage areas as designated by said designation means and for transmitting said data to said data recording medium playing apparatus in which said remote control transmission apparatus is powered by a battery, and in which said memory means comprises a back-up function whereby data stored in said memory means are held stored therein for a predetermined time following removal of said battery.

11. A remote control transmission apparatus for executing remote operation of a data recording medium playing apparatus, comprising command means for establishing program data which express track numbers respectively representative of selected ones from a plurality of music pieces which are recorded on a data recording medium and to be played in sequence, memory means having at least one program storage area, designation means for designating program storage areas of said memory means, write-in means for executing write-in of the selected program data established by said command means to said program storage area which is designated by said designation means, and transmission means for executing read-out in response to transmission commands of program data which have been written into said program storage area as designated by said designation means and for transmitting said data to said data recording medium playing apparatus.

* * * * *